US011874972B1

(12) United States Patent
Cox et al.

(10) Patent No.: US 11,874,972 B1
(45) Date of Patent: Jan. 16, 2024

(54) CURVED SURFACE TOUCH DETECTION SYSTEMS AND METHODS

(71) Applicant: Dell Products L.P., Round Rock, TX (US)

(72) Inventors: Tyler Ryan Cox, Austin, TX (US); Jason Scott Morrison, Chadron, NE (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/150,532

(22) Filed: Jan. 5, 2023

(51) Int. Cl.
*G06F 3/041* (2006.01)
*G06F 3/023* (2006.01)
*G06F 3/01* (2006.01)
*G06F 3/0354* (2013.01)

(52) U.S. Cl.
CPC .............. *G06F 3/023* (2013.01); *G06F 3/016* (2013.01); *G06F 3/03547* (2013.01)

(58) Field of Classification Search
None
See application file for complete search history.

(56) References Cited

U.S. PATENT DOCUMENTS

2018/0052565 A1* 2/2018 Zhang ..................... G06F 3/044

* cited by examiner

*Primary Examiner* — Carl Adams
(74) *Attorney, Agent, or Firm* — Norton Rose Fulbright US LLP

(57) ABSTRACT

Embodiments of a new and innovative method for processing input touch data for a curved touch sensitive surface by converting input touch vectors to position states is disclosed. The method includes receiving an input touch vector based on one or more signals from a plurality of touch sensors; selecting a largest continuous segment of values in the input touch vector that are indicative of a touch sensor being active; and assigning the input touch vector to a position state of a plurality of position states based on one or more index values corresponding to the selected largest continuous segment of values. If there is more than one equally largest continuous segment of values, then the equally largest continuous segment of values is selected that corresponds to one or more sensors furthest from a second end of the curved touch sensitive surface.

20 Claims, 13 Drawing Sheets

|  | P=6 | P=5 | P=4 | P=3 | P=2 | P=1 | P=0 |
|---|---|---|---|---|---|---|---|
| $T_3$ | 1\|1\|1\|1 | 1\|1 | 0\|1\|1\|0 | 0\|1 | 0\|0 | 0\|1 | 0 |
| $T_2$ | 0\|0\|0\|0 | 1\|1 | 1\|1\|1\|1 | 1\|1 | 0\|1 | 0\|0 | 0 |
| $T_1$ | 0\|1\|1\|0 | 0\|0 | 0\|1\|1\|0 | 1\|1 | 1\|1 | 1\|1 | 0 |
| $T_0$ | 0\|0\|1\|1 | 0\|1 | 0\|0\|1\|1 | 0\|1 | 0\|1 | 1\|1 | 1 |

FIG. 10

CURVED SURFACE TOUCH DETECTION SYSTEMS AND METHODS

FIELD OF THE DISCLOSURE

The instant disclosure relates to information handling systems. More specifically, portions of this disclosure relate to a touch detection on a touch sensitive curved surface.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Information handling systems may be used to execute applications such as gaming applications. Users typically interact with gaming applications presented on a device display (e.g., a computer monitor, TV, tablet, etc.) through the use of a variety of input and/or output devices. For instance, users typically use a computer mouse when playing a gaming application on a computer. One particularly useful feature of a computer mouse for playing a gaming application is the scroll wheel. For example, users often use the scroll wheel for quick swaps within a list of options in a game. As such, scroll wheel operations are essential for an input device used to play a gaming application on a computer.

Aspects of embodiments of this disclosure involve a curved, touch sensitive surface that mimics the operations and tactile feedback of a scroll wheel. The curved, touch sensitive surface can be part of a button construct. For example, the curved, touch sensitive surface may be a part of a button (e.g., bumper button) included with a gaming controller. The bumper button acts like a typical clickable button and is also touch sensitive to allow swiping motions like a mouse scroll wheel. To provide a convincing scroll wheel effect, the button construct can include haptic feedback as a user scrolls using the bumper button. The three-dimensional curved surface of the button construct creates problems for accurately detecting intended touches of the surface. For instance, a person intending to touch a portion of the curved surface with a tip of their finger might accidentally additionally touch another portion of the curved surface with a more proximal portion of their finger. To overcome these problems, embodiments of this disclosure include systems and methods for processing input touch data in a way that considers multi-channel (i.e. multi-sensor) measurements, finger geometry, hand grip position, and sensor voting in order to identify intended touches by a user.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. As such, it is advantageous to have a single gaming controller that can be used across multiple environments that have different game hosting devices (e.g., one environment has a computer whereas another environment has a TV) while also providing desired user experience when used with each of the game hosting devices. Embodiments of the gaming controller described herein provide a desired user experience for gameplay on both a TV and a computer by including the provided button construct having a curved, touch sensitive button that mimics the function and tactile feedback of a typical computer mouse's scroll wheel.

The solution for supporting the execution of gaming applications in different environments accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously. The system may adjust the aspect ratio of one or both of the games when hosted simultaneously on the same consumption device.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front of a device. An intelligent system may assemble these individual pieces of telemetry into a broader knowledge graph based on the absolute and/or relative locations of the user's devices, the location of the user in relation, and or characteristics of the devices. This knowledge graph may be updated in real time and/or based on changes in device telemetry.

According to one embodiment, a method comprises receiving, by a processor, an input touch vector based on one or more signals from a touch sensor having a plurality of touch input channels. The touch sensor is arranged between a first end of a curved surface and a second end of the curved surface. Each value of the input touch vector corresponds to an index value of a respective touch input channel of the touch sensor. The method further comprises selecting, by the processor, a largest continuous segment of values in the input touch vector that are indicative of a touch input channel of the touch sensor being active. If there is more than one equally largest continuous segment of values, then the equally largest continuous segment of values is selected that corresponds to one or more touch input channels furthest from the second end of the curved surface. The method further comprises assigning, by the processor, the input touch vector to a position state of a plurality of position states based on the one or more index values corresponding to the selected largest continuous segment of values, and determining, by the processor, a user input based on the assigned position state.

In certain embodiments, each value of the input touch vector is a value indicative of a touch sensor being active or is a value indicative of a touch sensor being inactive.

In certain embodiments, assigning the input touch vector to a position state comprises determining an average of the one or more index values corresponding to the selected largest continuous segment of values; multiplying the determined average by two to generate an output; and assigning the input touch vector to the position state corresponding to the generated output.

In certain embodiments, the method further comprises receiving, by the processor, a second input touch vector; and detecting, with the processor, a swiping motion of a member along the curved surface by detecting a change in the assigned position state of the second input touch vector compared to the assigned position state of the input touch vector.

In certain embodiments, the method further comprises generating, using the processor, haptic feedback upon detecting the change in the assigned position state.

According to another embodiment, a system comprises a memory; and a processor in communication with the memory. The processor is configured to perform the operations comprising receiving an input touch vector based on one or more signals from a touch sensor having a plurality of touch input channels. The touch sensor is arranged between a first end of a curved surface and a second end of the curved surface. Each value of the input touch vector corresponds to an index value of a respective touch input channel of the touch sensor. The operations further comprise selecting a largest continuous segment of values in the input touch vector that are indicative of a touch input channel of the touch sensor being active. If there is more than one equally largest continuous segment of values, then the equally largest continuous segment of values is selected that corresponds to one or more touch input channels furthest from the second end of the curved surface. The operations further comprise assigning the input touch vector to a position state of a plurality of position states based on the one or more index values corresponding to the selected largest continuous segment of values, and determining a user input based on the assigned position state.

According to another embodiment, an apparatus comprises a button construct, a memory, and a processor in communication with the memory. The button construct includes a curved surface having a first side configured to be contacted by a user and a second side, the button construct further including a touch sensor arranged on the second side of the curved surface between a first end of the curved surface and a second end of the curved surface. The touch sensor includes a plurality of touch input channels. The processor is configured to perform the operations comprising receiving an input touch vector based on one or more signals from the touch sensor. Each value of the input touch vector corresponds to an index value of a respective touch input channel of the touch sensor. The operations further comprise selecting a largest continuous segment of values in the input touch vector that are indicative of a touch input channel of the touch sensor being active. If there is more than one equally largest continuous segment of values, then the equally largest continuous segment of values is selected that corresponds to one or more touch input channels furthest from the second end of the curved surface. The operations further comprise assigning the input touch vector to a position state of a plurality of position states based on the one or more index values corresponding to the selected largest continuous segment of values, and determining a user input based on the assigned position state.

In certain embodiments, the button construct further includes a haptic component, and the operations further comprise generating haptic feedback via the haptic component upon detecting the change in the assigned position state.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

FIG. 10 is a table of touch vectors for an example including four touch sensors according to some embodiments of the disclosure.

DETAILED DESCRIPTION

Figure 1:
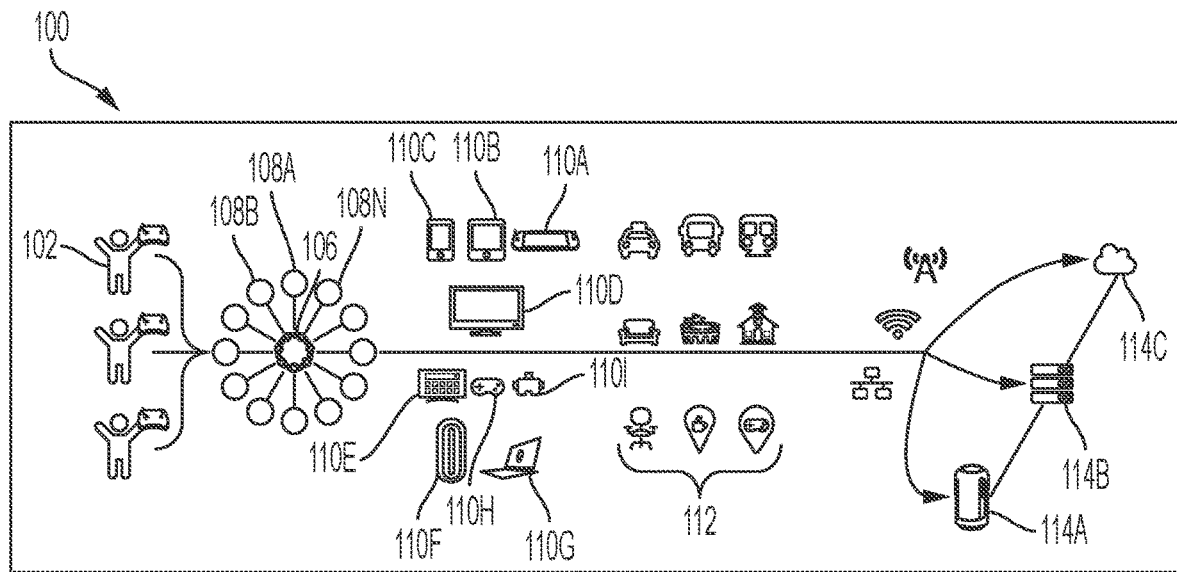
FIG. 1 is a block diagram illustrating aspects of a configurable system for providing services to users according to some embodiments of the disclosure.

These example embodiments describe and illustrate various aspects of a gaming controller that may used with a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller having an embodiment of the button construct described herein. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. If the host device within the new environment has a display with a different aspect ratio, the hub device may modify the user interface of the application to accommodate the different aspect ratio. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
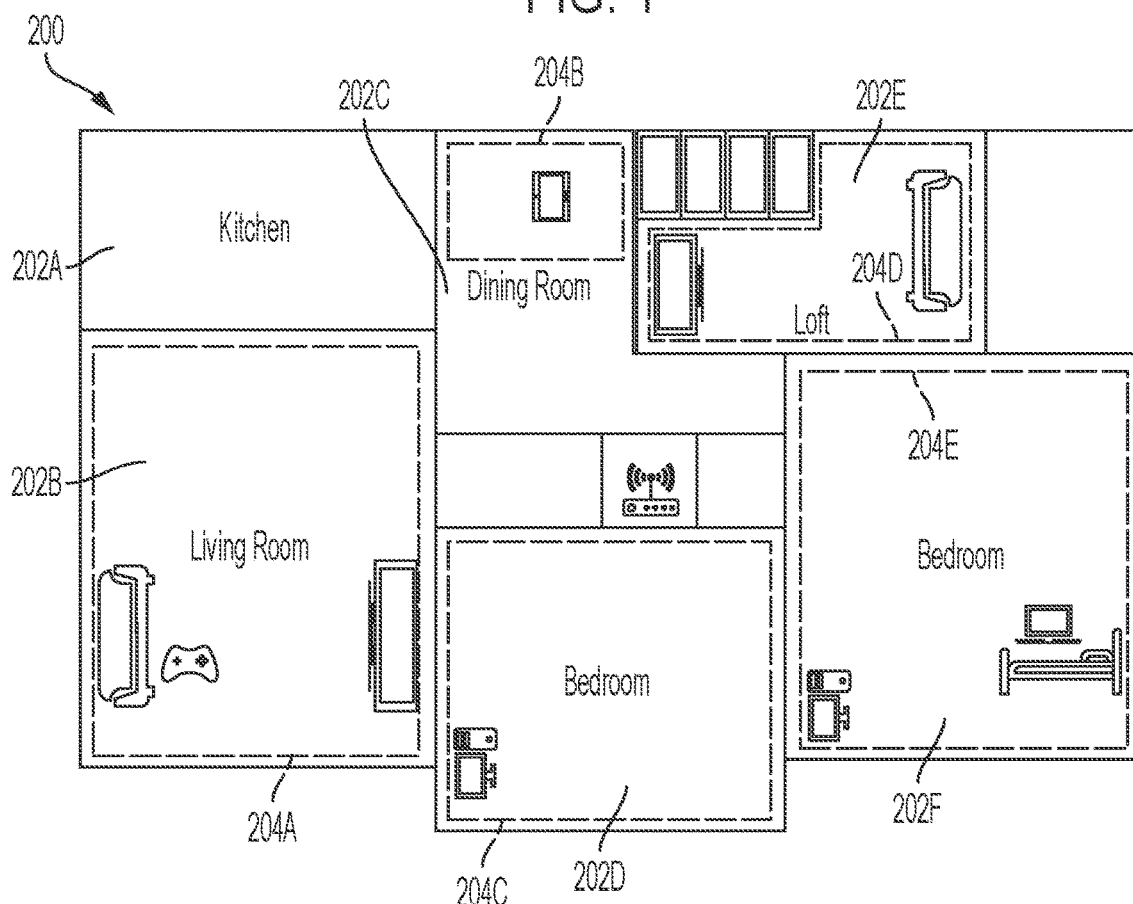
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as the gaming controller described herein, from environment 204A to environment 204C. The gaming controller may migrate and reconfigure for operation in environment 204C from a configuration for environment 204A. For example, the controller may transition from an application hosted on a TV in living room 202B to an application hosted on a TV in dining room 202C while remaining connected to a host service executing on a PC in bedroom 202D.

Figure 3A:
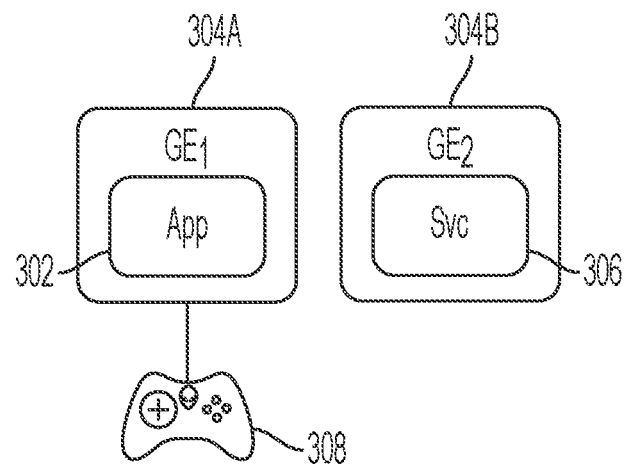
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
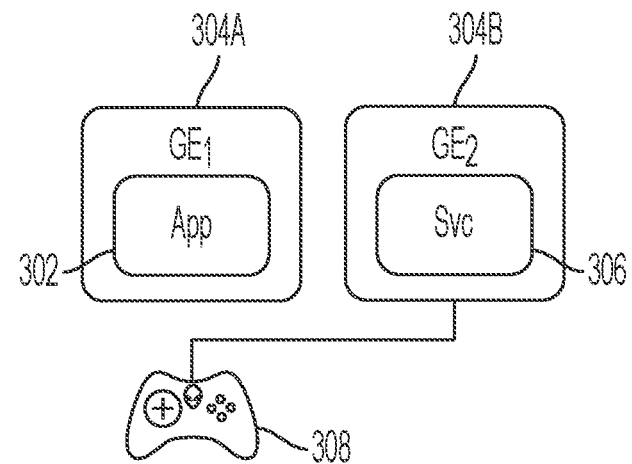
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
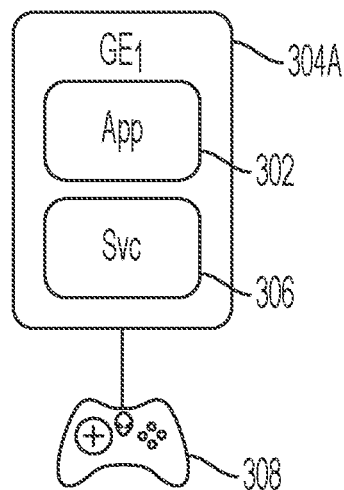
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
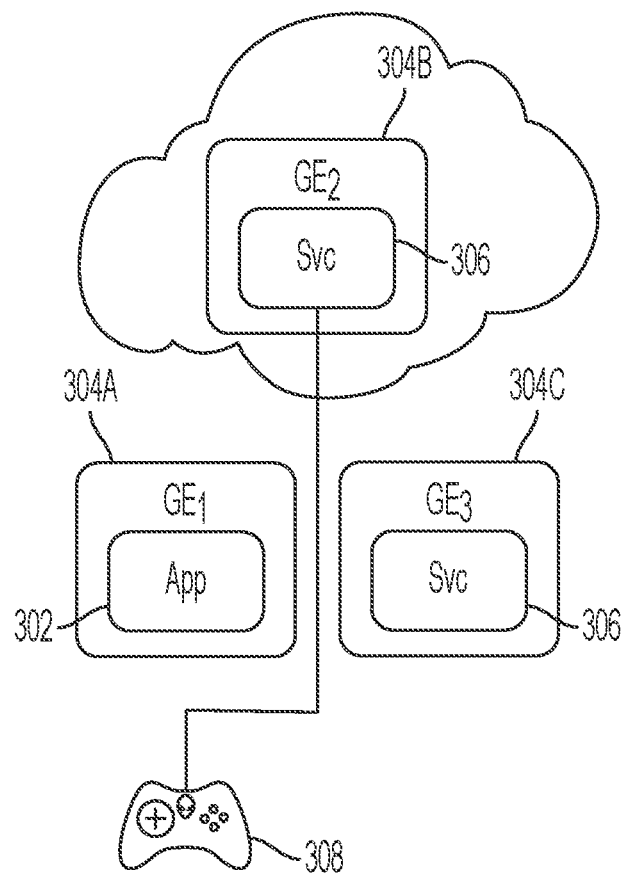
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

Figure 4:
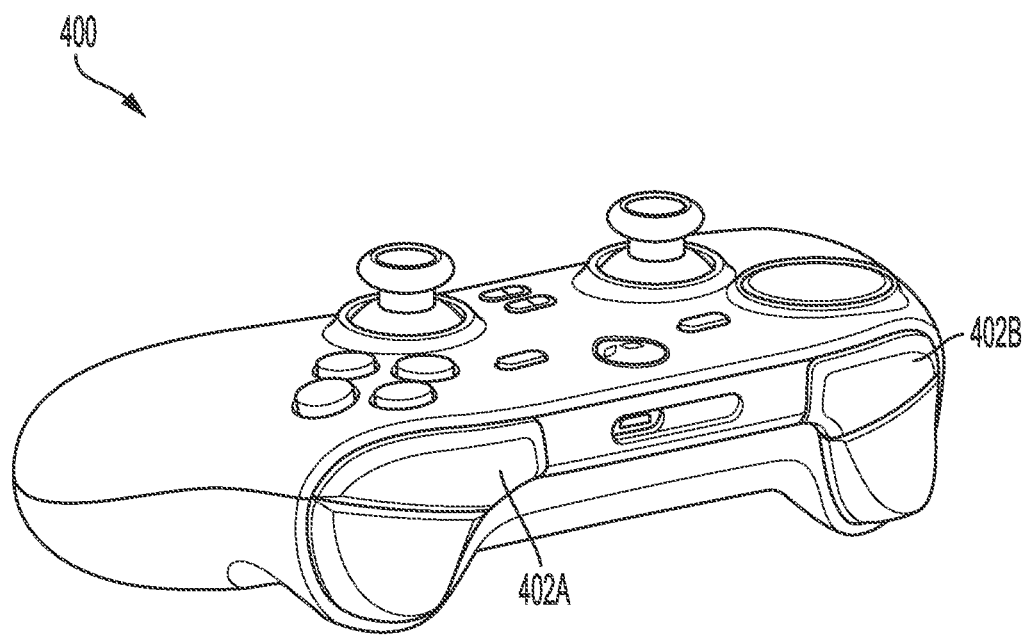
FIG. 4 is a perspective view of a gaming controller according to some embodiments of the disclosure.

As mentioned above, it is advantageous to have a single gaming controller that can be used across multiple environments that have different game hosting devices (e.g., one environment has a computer whereas another environment has a TV) while also providing desired user experience when used with each of the game hosting devices. FIG. 4 shows an example gaming controller 400 that enables desired user experience when used with a computer as well as with other hosting devices such as a TV. The gaming controller 400 has a controller frame 404 along with a button 402A and a button 402B. Each of the buttons 402A and 402B includes a portion that is curved. For example, each of the buttons 402A and 402B is a bumper button in this embodiment of the disclosure. As described below, each of the buttons 402A and 402B is a component of a button construct configured to detect a user pressing a button 402A or 402B or conducting a swiping motion along a button 402A or 402B. Though not described here, one having skill in the art should appreciate the various other buttons (e.g., trigger button) and control mechanisms (e.g., joystick) that may be included with the gaming controller 400.

Figure 5:
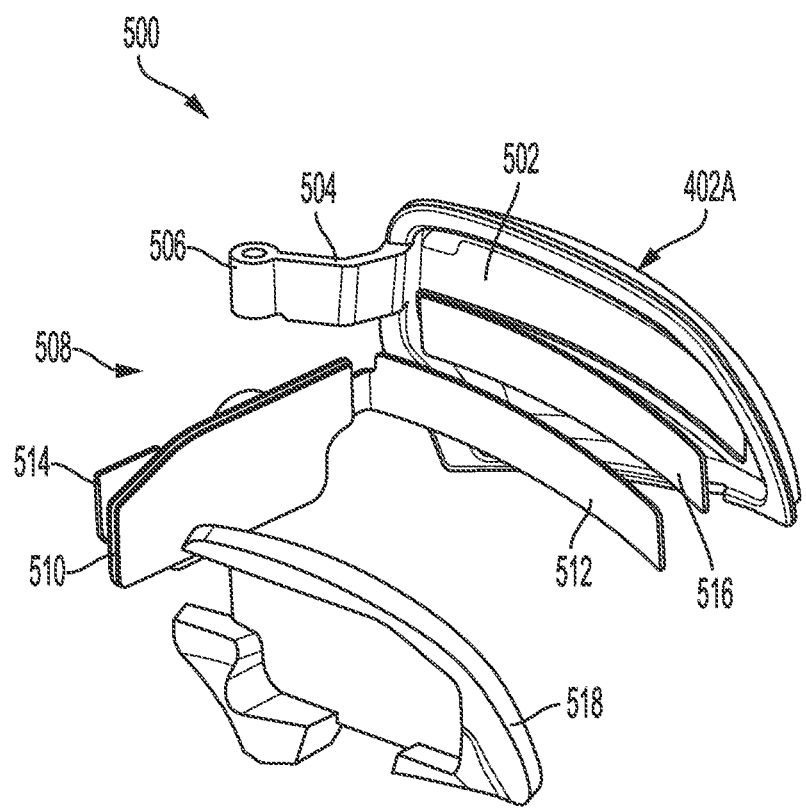
FIG. 5 is an exploded view of a button construct according to some embodiments of the disclosure.
Figure 6:
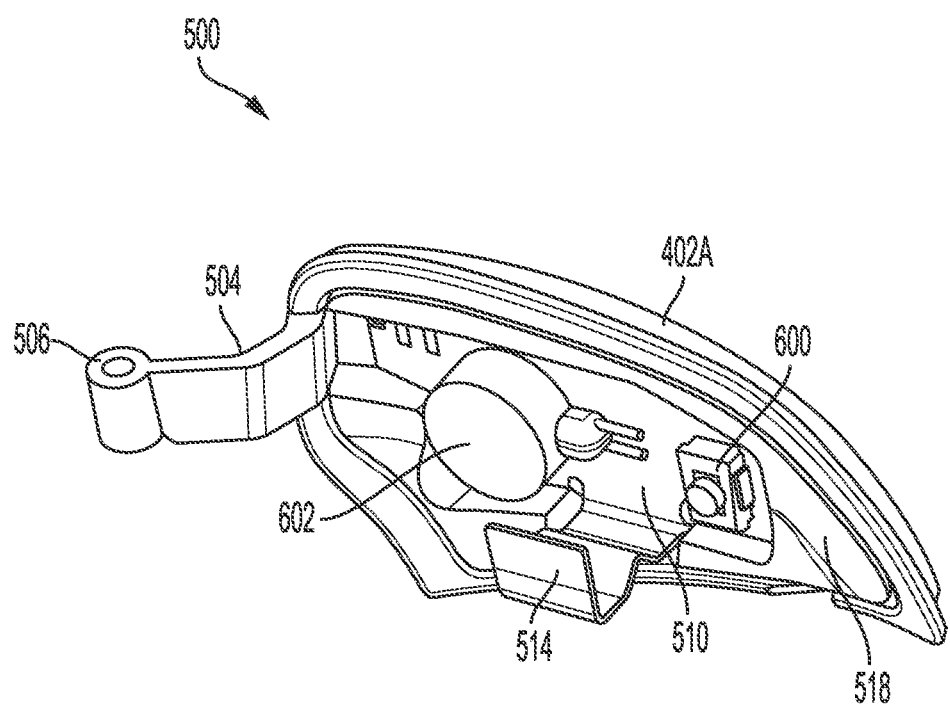
FIG. 6 is a perspective view of the button construct of FIG. 5 according to some embodiments of the disclosure.

FIGS. 5 and 6 show an example button construct 500 including the button 402A of the gaming controller 400, though it will be understood that the button construct 500 could be a mirror image and include the button 402B instead. Additionally, the concepts of the button construct 500 described herein can be applied to suitable buttons other than the button 402A or the button 402B, such as to other suitable buttons having a curved surface whether or not such suitable buttons are components of a gaming controller. The button 402A has a first, exterior side (visible in FIG. 4) that a user may contact and a second, interior side having a surface 502. In various embodiments, the button 402A includes an arm 504 extending from the main portion of the button 402A and terminating in an end 506. The end 506 may be pivotably attached to a portion of the controller frame 404 of the gaming controller 400. The pivotable attachment of the button 402A to the controller frame 404 enables the button 402A to maintain its relative position as it is pressed into the gaming controller 400.

The button construct 500 further includes a flexible printed circuit 508. The flexible printed circuit 508 includes a rigid portion 510 (e.g., second portion) and a flexible portion 512 (e.g., first portion) that are integral with one another. While the rigid portion 510 is stiff and not bendable, the flexible portion 512 is bendable relative to the rigid portion 510. The rigid portion 510 includes a plurality of components. For example, in at least some embodiments, the rigid portion 510 includes a tact switch 600. In at least some embodiments, the rigid portion 510 includes a linear resonant actuator 602 configured to generate haptic feedback (e.g., vibration), as will be described in more detail below. In some embodiments, the rigid portion 510 includes a tail 514 configured to connect the button construct 500 (e.g., the flexible printed circuit 508) to a motherboard of the gaming controller 400. The tail 514 allows movement of the button construct 500 as a user presses the button 402A. The flexible portion 512 includes at least one touch sensor. The at least one touch sensor can include any suitable quantity of channels (e.g., 2, 3, 4, 6, 10, etc. independent channels) for touch input. In at least some embodiments, the at least one touch sensor may be a capacitive sensor that can sense a relative strength of a touch against the button 402A. The flexible portion 512 may be attached (e.g., directly) to the surface 502 of the button 402A. For example, adhesive 516 may attach the flexible portion 512 directly to the surface 502. The flexible portion 512 may be curved so as to follow the curved surface 502 without any air gaps.

In at least some embodiments, the button construct 500 includes a frame 518. The frame 518 is configured to attach to the button 402A in a suitable manner. For example, the frame 518 may snap into the side of the button 402A having the surface 502. In another example, the frame 518 is secured to the button 402A with adhesive (e.g., glue). When the frame is attached to the button 402A, the frame 518 covers the flexible portion 512 attached to the surface 502 such that the flexible portion 512, and therefore the at least one touch sensor, is between the surface 502 and the frame 518. In this arrangement, the flexible portion 512 enables the rigid portion 510 to be folded over such that the side of the rigid portion 510 absent the plurality of components faces towards the flexible portion 512. In at least some embodiments, the frame 518 is shaped with an indent to receive the rigid portion 510 when it is folded over. FIG. 6 shows a final construction of the button construct 500 with the rigid portion 510 and the flexible portion 512 folded relative to one another and the frame 518 in between the rigid portion 510 and the flexible portion 512. In this way, the frame 518 acts as a spacer that creates a gap between the at least one touch sensor on the flexible portion 510 and the linear resonant actuator 602 on the rigid portion 512. The gap eliminates any regions of poor touch sensitivity on the at least one touch sensor that would otherwise exist without the gap.

Figure 7:
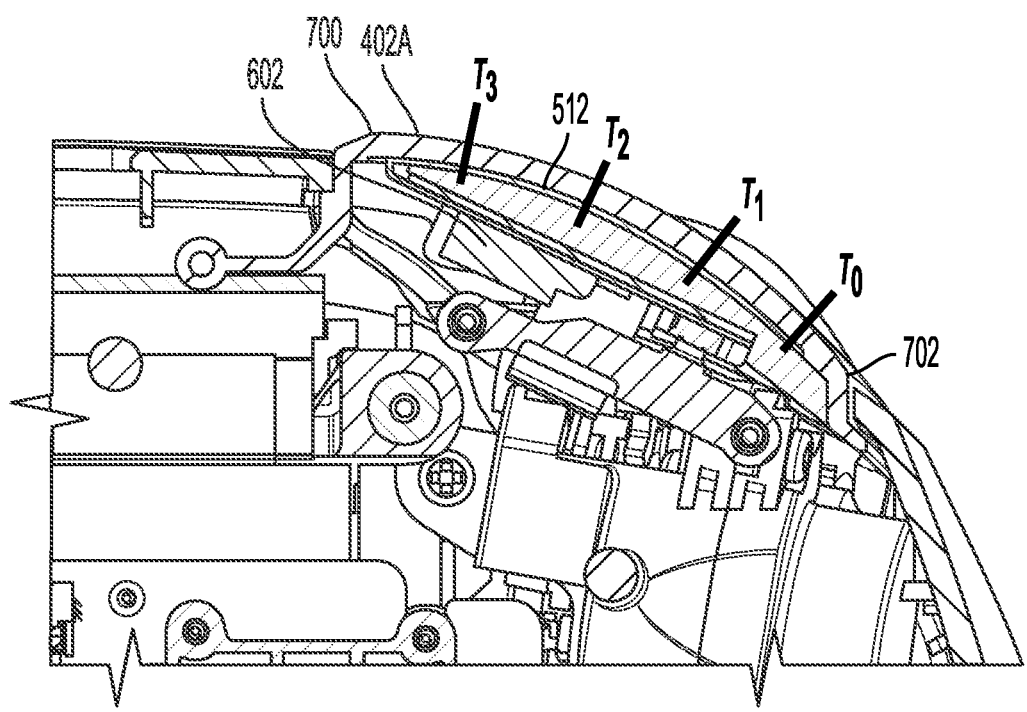
FIG. 7 is a cross section of a gaming controller having the button construct of FIG. 6 and showing touch sensor positions according to some embodiments of the disclosure.
Figure 11A:
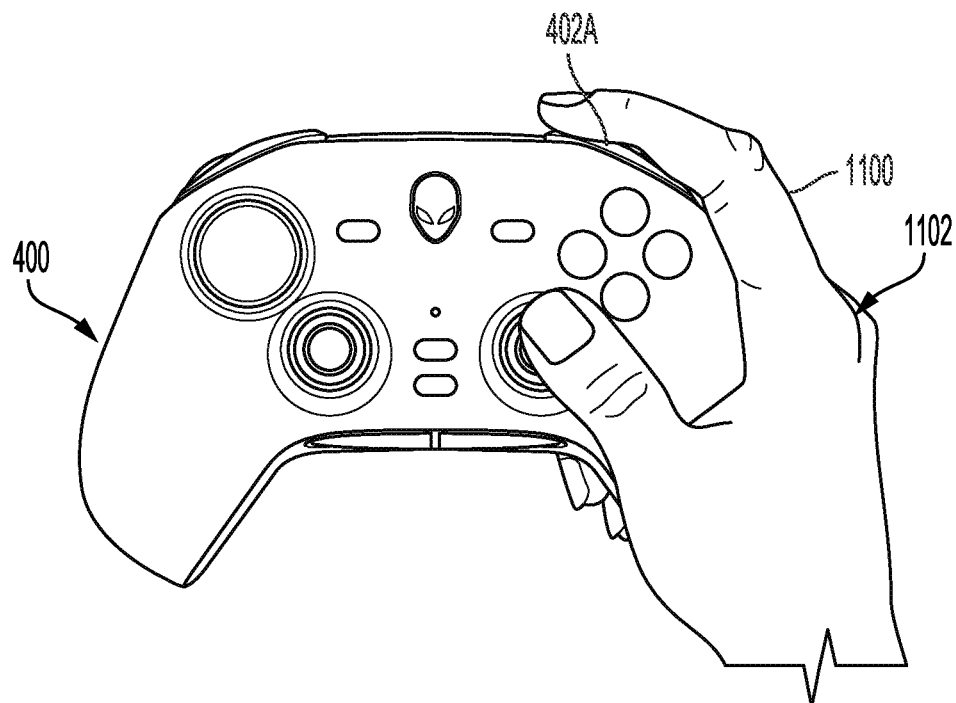
FIGS. 11A and 11B are examples of a user touching a button at two different positions according to some embodiments of the disclosure.
Figure 11B:
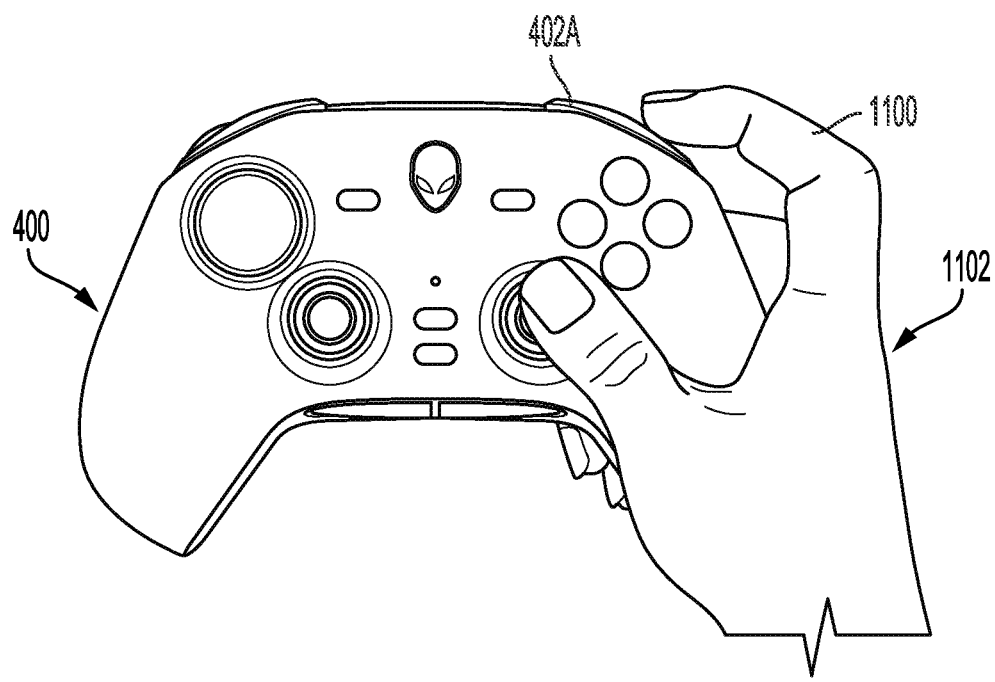

FIG. 7 illustrates a cross section of a portion of the gaming controller 400 including the button construct 500. In this example, the flexible portion 512 of the flexible printed circuit 508 includes a touch sensor that includes four independent touch input channels $T_0$, $T_1$, $T_2$, and $T_3$. As shown, the four independent channels $T_0$, $T_1$, $T_2$, and $T_3$ are arranged between a first end 700 and a second end 702 of the curved portion of the button 402A. The four independent channels $T_0$, $T_1$, $T_2$, and $T_3$ are therefore arranged between the first end 700 and the second end 702 of the interior and exterior surfaces of the button 402A. When a user contacts the button 402A (e.g., with a finger), an input touch vector is generated with a Boolean value (e.g., 1 or 0) for each touch sensor. For example, if a user contacts the button 402A as shown in FIG. 11A such that the touch sensor only senses a touch input at the channels $T_1$ and $T_3$, then an input touch vector of [0,1,0,1] is generated. In another example, if a user contacts the button 402A as shown in FIG. 11B such that the touch sensor only senses a touch input at the channels $T_2$ and $T_3$, then an input touch vector of [0,0,1,1] is generated. Each of the channels $T_0$, $T_1$, $T_2$, and $T_3$ of the touch sensor is associated with an index value and therefore each of the values in the input touch vector is associated with an index value of the corresponding channel $T_0$, $T_1$, $T_2$, and $T_3$. For example, in the input touch vector [0,1,0,1], the first "0" value corresponds to the channel $T_0$ and is therefore associated with an index value of "0". The first "1" value corresponds to the channel $T_1$ and is therefore associated with an index value of "1". The second "0" value corresponds to the channel $T_2$ and is therefore associated with an index value of "2", and the second "1" value corresponds to channel $T_3$ and is therefore associated with an index value of "3".

Relying solely upon these input touch vectors, however, can pose challenges for processing the input touch data because the curved surface of the button 402A in combination with a user's hand position on the gaming controller 400 and finger geometry is conducive to accidental contacts with the button 402A. The accidental contacts lead to channels of the touch sensor being inadvertently activated. For example, FIG. 11A shows the user intentionally contacting the button 402A at the channel $T_3$ and inadvertently at the channel $T_1$. From solely the input touch vector [0,1,0,1] (i.e. input to a processor) it is unclear which touch is intentional and which is inadvertent. This distinction becomes even more relevant when a user conducts a swiping motion along the button 402A. A swiping motion includes the user placing a finger against the exterior surface of the button 402A and then dragging the finger across the exterior surface, while maintaining contact, along a portion of the exterior surface of the button 402A. As such, starting from the input touch vector [0,1,0,1], if the next input touch vector detected is [0,0,1,0] during a swiping motion, then it is imperative to be able to process whether the user swiped from $T_3$ to $T_2$ or from $T_1$ to $T_2$.

Figure 8:
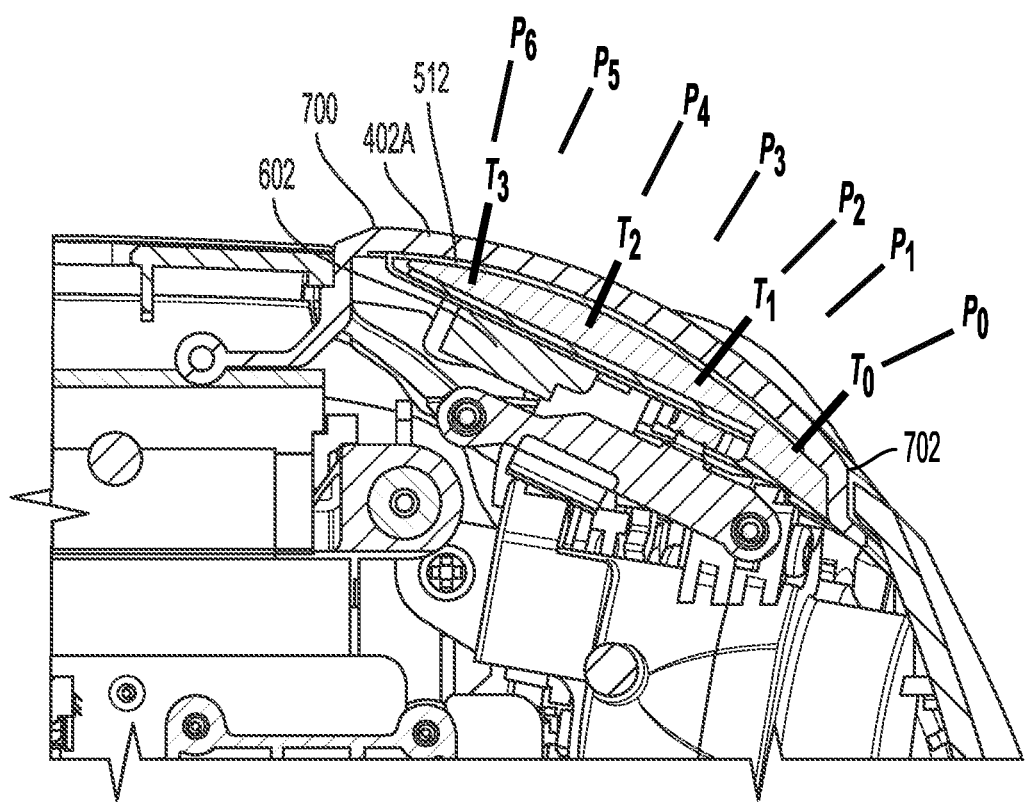
FIG. 8 is the cross section of FIG. 7 also showing finger positions according to some embodiments of the disclosure.

The present disclosure addresses at least these problems by converting input touch vectors in channel states to position states when processing input touch data. The quantity of position states is based on a quantity of channels of the at least one touch sensor included in the button construct 500. FIG. 8 illustrates the cross section of FIG. 7 while also showing position states $P_0$, $P_1$, $P_2$, $P_3$, $P_4$, $P_5$, and $P_6$ defined based on the channels $T_0$, $T_1$, $T_2$, and $T_3$ of the touch sensor. As shown, each of position states $P_0$, $P_2$, $P_4$, and $P_6$ are at the respective channels $T_0$, $T_1$, $T_2$, and $T_3$, whereas each of position states $P_1$, $P_3$, and $P_5$ are in between (e.g., exactly between) the channels $T_0$, $T_1$, $T_2$, and $T_3$. In other examples, the position states P are generally defined by Equation 1 below in which n is a quantity of channels of a touch sensor.

$$P \in [0, 2n-2] \qquad (1)$$

Figure 9:
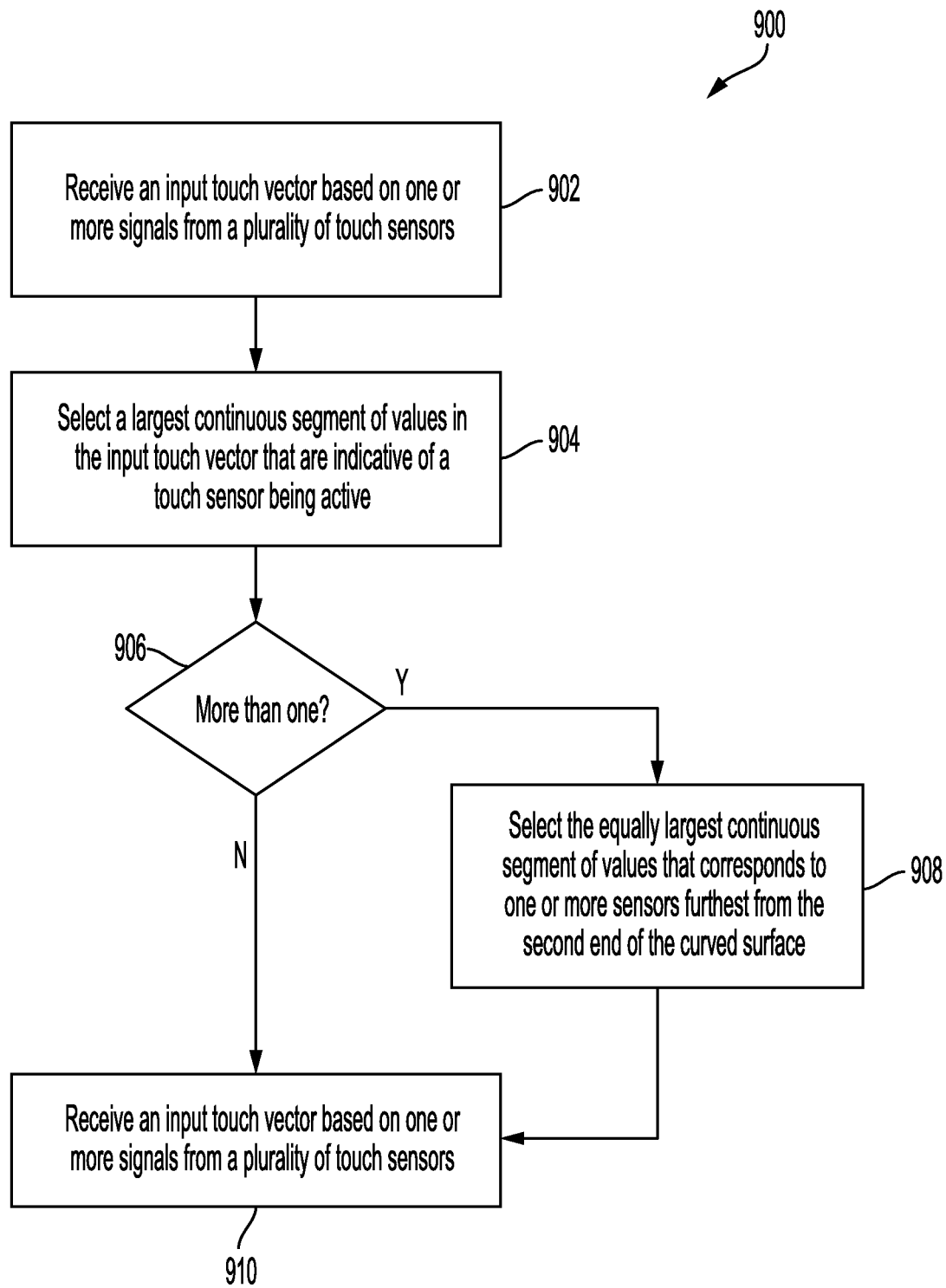
FIG. 9 is a block diagram of a method for processing touch input data according to some embodiments of the disclosure.

FIG. 9 is a block diagram of an example method 900 for processing input touch data. FIG. 10 is a table 1000 showing possible input touch vectors assigned to position states for an example system including a touch sensor having four independent touch input channels. The table 1000 will be referenced when describing the example method 900. At block 902, an input touch vector is received by a processor (e.g., the processor of the gaming controller 400) based on one or more signals from at least one touch sensor (e.g., the touch sensor of the flexible portion 512). For example, the input touch vector [0,1,1,0] (e.g., the input touch vector 1002 in FIG. 10) is received. The at least one touch sensor is arranged between a first end (e.g., first end 700) of a curved surface (e.g., the button 402A) and a second end (e.g., second end 702) of the curved surface. Each value of the input touch vector [0,1,1,0] corresponds to an index value of a respective touch input channel of the at least one touch sensor. For instance, the values of the input touch vector [0,1,1,0] from left to right correspond to index values of 0, 1, 2, and 3, respectively. Each value of the input touch vector [0,1,1,0] is a value indicative of a channel of the touch sensor being active (i.e. sensing an input touch) or is a value indicative of a channel of the touch sensor being inactive (i.e. not sensing an input touch). In this example, the value "1" indicates a channel is active, whereas the value "0" indicates a channel is inactive.

At block 904, a largest continuous segment of values in the input touch vector [0,1,1,0] that are indicative of a channel being active (i.e. "1" values) are selected. In this example, the largest continuous segment is the two consecutive "1" values because there are no other "1" values in the input touch vector. As such, in this example, at diamond 906 there is not more than one equally largest continuous segment of values, and therefore the method 900 proceeds to block 910.

Alternatively, if the received input touch vector does have more than one equally largest continuous segment of values, then the method 900 proceeds to block 908. For example, if the input touch vector [0,1,0,1] (e.g., the input touch vector 1004) is received, then there are two separate segments of "1" values and each of the segments only has a single "1" value. Therefore, the input touch vector [0,1,0,1] has two equally largest continuous segments of values that are indicative of a channel being active. In this alternative example, at block 908, the equally largest continuous segment of values that corresponds to one or more channels furthest from the second end of the curved surface is selected. More generally, the second end of the curved surface is defined as the end of the curved surface that is closest to an origin point of a member that touches the curved surface. For example, in the depictions shown in FIGS. 11A and 11B, a user touches the curved surface of the button 402A with a finger 1100. The origin point 1102 of the finger 1100 is the knuckle that connects the finger 1100 to the palm, or the palm more generally. As such, the second end 702 of the curved surface of the button 402A is closest to the origin point 1102.

Continuing the alternative example, the first "1" value in the input touch vector [0,1,0,1] corresponds to the channel $T_1$ of the touch sensor, and the second "1" value in the input touch vector [0,1,0,1] corresponds to the channel $T_3$. The channel $T_3$ is further from the second end 702 of the button 402A and therefore the second "1" value is selected.

At block 910, the input touch vector is assigned to a position state of a plurality of position states based on the one or more index values corresponding to the selected largest continuous segment of values. In at least some embodiments, the assigning the input touch vector to a position state comprises determining an average of the one or more index values corresponding to the selected largest continuous segment of values; multiplying the determined average by two to generate an output; and assigning the input touch vector to the position state corresponding to the generated output. In the first example of the input touch vector [0,1,1,0], the selected largest continuous segment of values corresponds to the index values "1" and "2". The average of "1" and "2" multiplied by two equals "3". As such, the input touch vector [0,1,1,0] is assigned to the position state of "3" as shown in the table 1000. In the second example of the input touch vector [0,1,0,1], the selected largest continuous segment of values corresponds to the index value "3". The average of "3" multiplied by two equals "6". As such, the input touch vector [0,1,0,1] is assigned to the position state of "6" as shown in the table 1000.

In some embodiments, two or more different input touch vectors may be received in succession without all of the channels $T_0$, $T_1$, $T_2$, and $T_3$ of the touch sensor becoming inactive between receiving the successive input touch vectors. For example, when a user conducts a swiping motion along the curved surface (e.g., the button 402A), the user maintains contact with the button 402A the entire time (i.e. activates at least one channel of the touch sensor) while dragging their finger along the button 402A. Conversely, when a user taps the button 402A, removes their finger, and then taps the button 402A again, there is a period between those two taps during which all of the channels $T_0$, $T_1$, $T_2$, and $T_3$ of the touch sensor become inactive. Continuing with the example of the input touch vector [0,1,1,0] being received, in these embodiments, the method further comprises receiving a second input touch vector [0,0,1,0] (e.g., the input touch vector 1006 in FIG. 10) and detecting a swiping motion of a member (e.g., a user's finger) along the button 402A by detecting a change in the assigned position state of the second input touch vector [0,0,1,0] compared to the assigned position state of the input touch vector [0,1,1,0]. Blocks 904-910 may be repeated for the second input touch vector [0,0,1,0], which results in assigning the second input touch vector [0,0,1,0] to the position state of "2" as shown in the table 1000. As such, a change from the position state of "3" of the input touch vector [0,1,1,0] to the position state of "2" of the second input touch vector [0,0,1,0] is detected. This change of position state indicates a swiping motion of the user's finger from the "3" position state to the "2" position state as long as all of the channels of the touch sensor have not been inactive between receiving the input touch vector [0,1,1,0] and the second input touch vector [0,0,1,0].

In various embodiments, the method further comprises generating haptic feedback (e.g., vibration) in response to receiving one or more input touch vectors. For example, the button construct 500 is configured to provide haptic feedback in response to user interactions with the button 402A. The processor of the gaming controller 400 can receive one or more input touch vectors and send a signal to the linear resonant actuator (LRA) 602 to generate vibration(s). For example, a vibration may be generated when a user taps the button 402A of the gaming controller 400. In another example, a vibration may be generated each time a change in assigned position state is detected during a swiping motion (i.e. each time a user's finger drags to a new position state during a swiping motion), which creates tactile feedback that simulates the mechanical scroll wheel effect of a computer mouse. Various embodiments include different haptic feedback profiles for swiping motions. For example, an equal strength vibration may be generated each time a new position state is detected during a swiping motion. In another example, an equal strength vibration is generated for every other position state change (e.g., when a change to position states $P_0$, $P_2$, $P_4$, and $P_6$ are detected). In another example, the vibrations may alternate between a stronger vibration and a weaker vibration during a swiping motion. Other suitable haptic feedback profiles are contemplated and included in the present disclosure, but not described for brevity of the disclosure.

In at least some embodiments, the method 900 further comprises executing an action based on the assigned position(s) of the input touch vector(s). In various aspects, when the input touch vector(s) are generated via at least one touch sensor of the gaming controller 400, the action may be a suitable game action on a game user interface. For example, a user may tap a certain portion of the button 402A to select an option in a menu displayed as part of a game user interface shown on a host device (e.g., television, computer monitor, etc.). In another example, a user may swipe along the button 402A of the gaming controller 400 in order to scroll through options in the menu. In some embodiments, the action may be executed by the processor on the gaming controller 400. In other embodiments, the processor on the gaming controller 400 may transmit a signal to a second processor (e.g., the home application hub 114A) so that the second processor executes the action.

Figure 12:
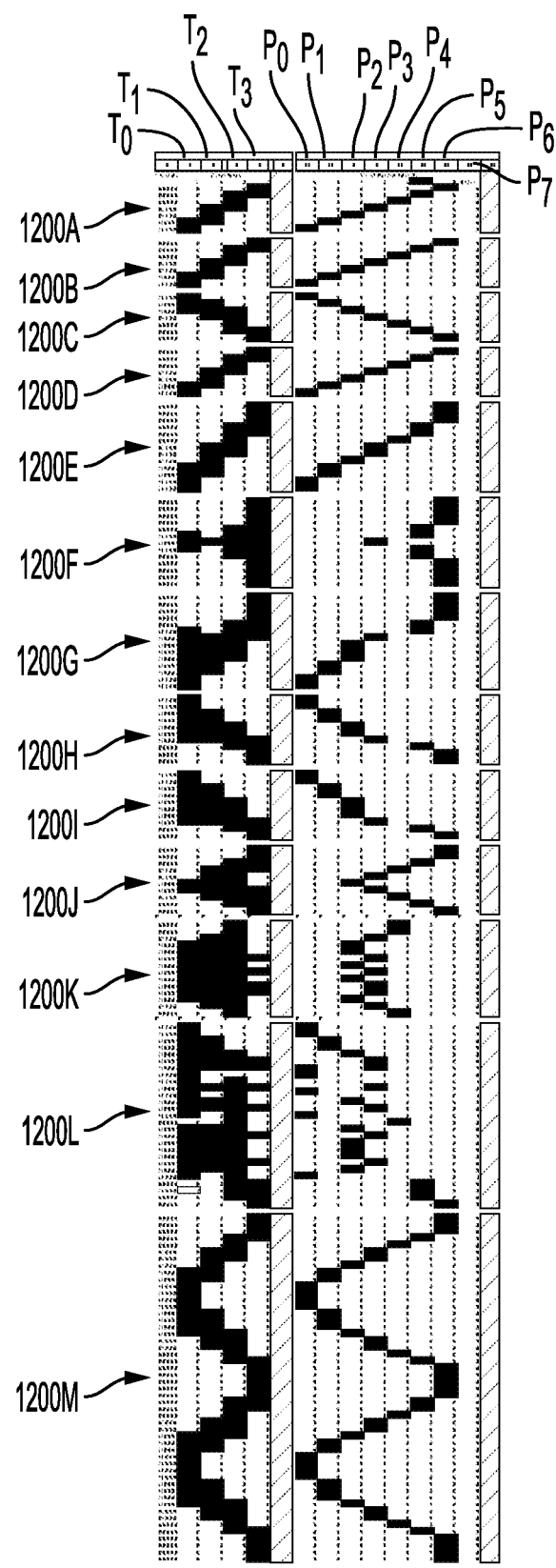
FIG. 12 is a table comparing input touch data between channel input data and position state data according to some embodiments of the disclosure.

FIG. 12 is a table showing a series of test sequences 1200A-1200M that compare input touch data between channel state (e.g., $T_0$, $T_1$, $T_2$, and $T_3$) data and position state (e.g., $P_0$, $P_1$, $P_2$, $P_3$, $P_4$, $P_5$, and $P_6$) data. As can be seen, the channel state data includes a lot of touch input variance and overlap, due to multiple sensors of varying counts touched across a test sequence (e.g., due to the curvature of the touch surface and the ergonomic interaction of user contact regions), between the channels. Conversely, the position state data includes much less overlap and instead provides a discrete value for each position suitable for absolute or relative directional sequential application input. The test data therefore demonstrates the improved effectiveness of accurately processing touch data when the channels states are converted into position states.

Figure 13:
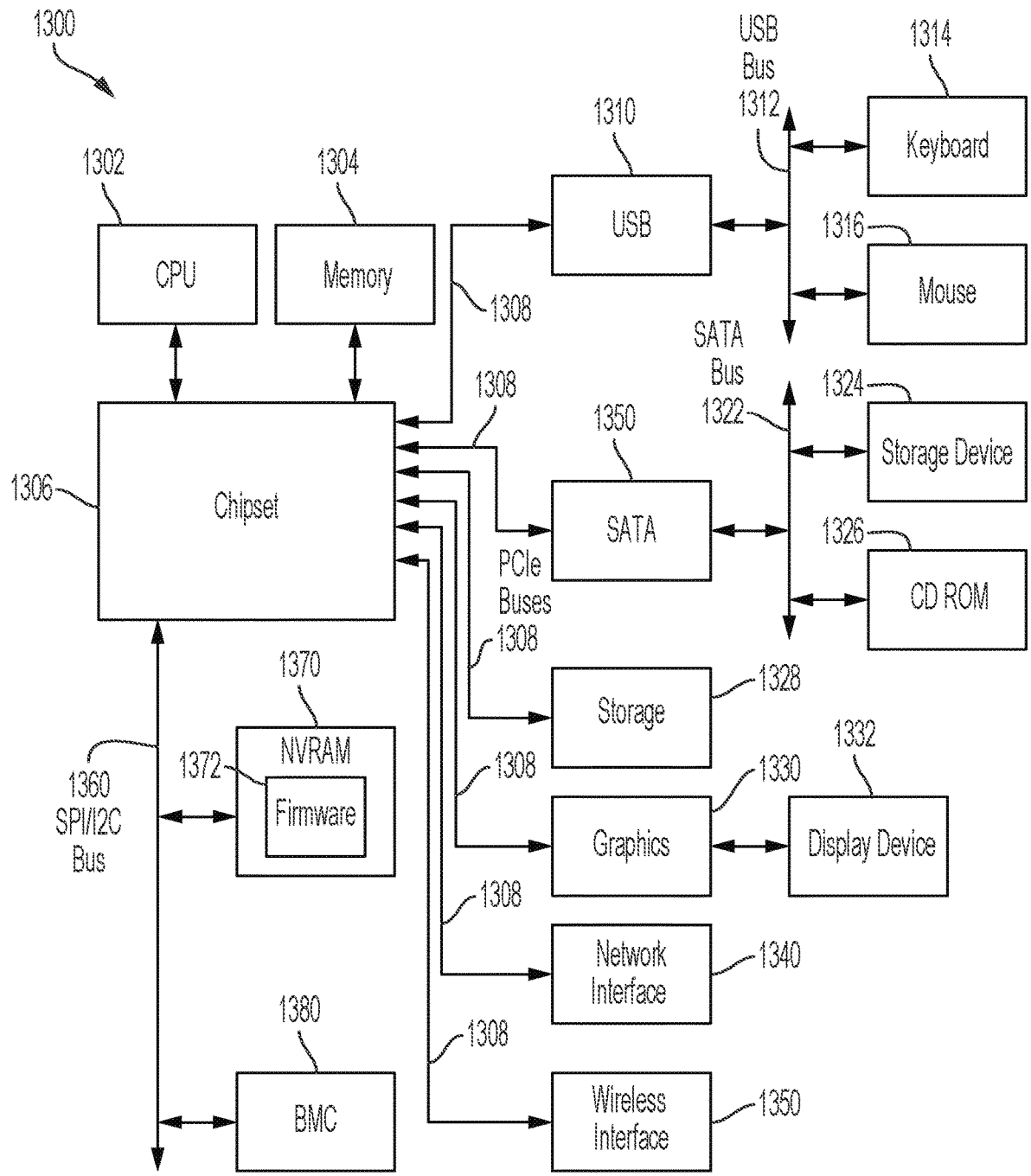
FIG. 13 is a schematic block diagram of an example information handling system according to some embodiments of the disclosure.

FIG. 13 illustrates an example information handling system 1300. Information handling system 1300 may include a processor 1302 (e.g., a central processing unit (CPU)), a memory (e.g., a dynamic random-access memory (DRAM)) 1304, and a chipset 1306. In some embodiments, one or more of the processor 1302, the memory 1304, and the chipset 1306 may be included on a motherboard (also referred to as a mainboard), which is a printed circuit board (PCB) with embedded conductors organized as transmission lines between the processor 1302, the memory 1304, the chipset 1306, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 1302, the memory 1304, the chipset 1306, and/or other components may be organized as a System on Chip (SoC).

The processor 1302 may execute program code by accessing instructions loaded into memory 1304 from a storage device, executing the instructions to operate on data also loaded into memory 1304 from a storage device, and generate output data that is stored back into memory 1304 or sent to another component. The processor 1302 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 1302 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 1306 may facilitate the transfer of data between the processor 1302, the memory 1304, and other components. In some embodiments, chipset 1306 may include two or more integrated circuits (ICs), such as a northbridge controller coupled to the processor 1302, the memory 1304, and a southbridge controller, with the southbridge controller coupled to the other components such as USB 1310, SATA 1320, and PCIe buses 1308. The chipset 1306 may couple to other components through one or more PCIe buses 1308.

Some components may be coupled to one bus line of the PCIe buses 1308, whereas some components may be coupled to more than one bus line of the PCIe buses 1308. One example component is a universal serial bus (USB) controller 1310, which interfaces the chipset 1306 to a USB bus 1312. A USB bus 1312 may couple input/output components such as a keyboard 1314 and a mouse 1316, but also other components such as USB flash drives, or another information handling system. Another example component is a SATA bus controller 1320, which couples the chipset 1306 to a SATA bus 1322. The SATA bus 1322 may facilitate efficient transfer of data between the chipset 1306 and components coupled to the chipset 1306 and a storage device 1324 (e.g., a hard disk drive (HDD) or solid-state disk drive (SDD)) and/or a compact disc read-only memory (CD-ROM) 1326. The PCIe bus 1308 may also couple the chipset 1306 directly to a storage device 1328 (e.g., a solid-state disk drive (SDD)). A further example of an example component is a graphics device 1330 (e.g., a graphics processing unit (GPU)) for generating output to a display device 1332, a network interface controller (NIC) 1340, and/or a wireless interface 1350 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 1306 may also be coupled to a serial peripheral interface (SPI) and/or Inter-Integrated Circuit (I2C) bus 1360, which couples the chipset 1306 to system management components. For example, a non-volatile random-access memory (NVRAM) 1370 for storing firmware 1372 may be coupled to the bus 1360. As another example, a controller, such as a baseboard management controller (BMC) 1380, may be coupled to the chipset 1306 through the bus 1360. BMC 1380 may be referred to as a service processor or embedded controller (EC). Capabilities and functions provided by BMC 1380 may vary considerably based on the type of information handling system. For example, the term baseboard management system may be used to describe an embedded processor included at a server, while an embedded controller may be found in a consumer-level device. As disclosed herein, BMC 1380 represents a processing device different from processor 1302, which provides various management functions for information handling system 1300. For example, an embedded controller may be responsible for power management, cooling management, and the like. An embedded controller included at a data storage system may be referred to as a storage enclosure processor or a chassis processor.

System 1300 may include additional processors that are configured to provide localized or specific control functions, such as a battery management controller. Bus 1360 can include one or more busses, including a Serial Peripheral Interface (SPI) bus, an Inter-Integrated Circuit (I2C) bus, a system management bus (SMBUS), a power management bus (PMBUS), or the like. BMC 1380 may be configured to provide out-of-band access to devices at information handling system 1300. Out-of-band access in the context of the bus 1360 may refer to operations performed prior to execution of firmware 1372 by processor 1302 to initialize operation of system 1300.

Firmware 1372 may include instructions executable by processor 102 to initialize and test the hardware components of system 1300. For example, the instructions may cause the processor 1302 to execute a power-on self-test (POST). The instructions may further cause the processor 1302 to load a boot loader or an operating system (OS) from a mass storage device. Firmware 1372 additionally may provide an abstraction layer for the hardware, such as a consistent way for application programs and operating systems to interact with the keyboard, display, and other input/output devices. When power is first applied to information handling system 1300, the system may begin a sequence of initialization procedures, such as a boot procedure or a secure boot procedure. During the initialization sequence, also referred to as a boot sequence, components of system 1300 may be configured and enabled for operation and device drivers may be installed. Device drivers may provide an interface through which other components of the system 1300 can communicate with a corresponding device. The firmware 1372 may include a basic input-output system (BIOS) and/or include a unified extensible firmware interface (UEFI). Firmware 1372 may also include one or more firmware modules of the information handling system. Additionally, configuration settings for the firmware 1372 and firmware of the information handling system 1300 may be stored in the NVRAM 1370. NVRAM 1370 may, for example, be a non-volatile firmware memory of the information handling system 1300 and may store a firmware memory map namespace 1300 of the information handling system. NVRAM 1370 may further store one or more container-specific firmware memory map namespaces for one or more containers concurrently executed by the information handling system.

Information handling system 1300 may include additional components and additional busses, not shown for clarity. For example, system 1300 may include multiple processor cores (either within processor 1302 or separately coupled to the chipset 1306 or through the PCIe buses 1308), audio devices (such as may be coupled to the chipset 1306 through one of the PCIe busses 1308), or the like. While a particular arrangement of bus technologies and interconnections is illustrated for the purpose of example, one of skill will appreciate that the techniques disclosed herein are applicable to other system architectures. System 1300 may include multiple processors and/or redundant bus controllers. In some embodiments, one or more components may be integrated together in an integrated circuit (IC), which is circuitry built on a common substrate. For example, portions of chipset 1306 can be integrated within processor 1302. Additional components of information handling system 1300 may include one or more storage devices that may store machine-executable code, one or more communications ports for communicating with external devices, and various input and output (I/O) devices, such as a keyboard, a mouse, and a video display.

In some embodiments, processor 1302 may include multiple processors, such as multiple processing cores for parallel processing by the information handling system 1300. For example, the information handling system 1300 may include a server comprising multiple processors for parallel processing. In some embodiments, the information handling system 1300 may support virtual machine (VM) operation, with multiple virtualized instances of one or more operating systems executed in parallel by the information handling system 1300. For example, resources, such as processors or processing cores of the information handling system may be assigned to multiple containerized instances of one or more operating systems of the information handling system 1300 executed in parallel. A container may, for example, be a virtual machine executed by the information handling system 1300 for execution of an instance of an operating system by the information handling system 1300. Thus, for example, multiple users may remotely connect to the information handling system 1300, such as in a cloud computing configuration, to utilize resources of the information handling system 1300, such as memory, processors, and other hardware, firmware, and software capabilities of the information handling system 1300. Parallel execution of multiple containers by the information handling system 1300 may allow the information handling system 1300 to execute tasks for multiple users in parallel secure virtual environments.

The schematic or flow chart diagrams of FIG. 9 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to

What is claimed is:

1. A method comprising:
receiving, by a processor, an input touch vector based on one or more signals from a touch sensor having a plurality of touch input channels, the touch sensor arranged between a first end of a curved surface and a second end of the curved surface, wherein each value of the input touch vector corresponds to an index value of a respective touch input channel of the touch sensor;
selecting, by the processor, a largest continuous segment of values in the input touch vector that are indicative of a touch input channel being active, wherein if there is more than one equally largest continuous segment of values, then selecting the equally largest continuous segment of values that corresponds to one or more touch input channels furthest from the second end of the curved surface;
assigning, by the processor, the input touch vector to a position state of a plurality of position states based on the one or more index values corresponding to the selected largest continuous segment of values; and
determining, by the processor, a user input based on the assigned position state.

2. The method of claim 1, wherein each value of the input touch vector is a value indicative of a touch input channel being active or is a value indicative of a touch input channel being inactive.

3. The method of claim 1, wherein the touch sensor is arranged on a curved surface.

4. The method of claim 1, wherein the plurality of position states include a respective position state at each of the plurality of touch input channels of the touch sensor and a respective position state between each of the adjacent touch input channels.

5. The method of claim 1, wherein assigning the input touch vector to a position state comprises determining an average of the one or more index values corresponding to the selected largest continuous segment of values; multiplying the determined average by two to generate an output; and assigning the input touch vector to the position state corresponding to the generated output.

6. The method of claim 1, further comprising:
receiving, by the processor, a second input touch vector; and
detecting, with the processor, a swiping motion of a member along the curved surface by detecting a change in the assigned position state of the second input touch vector compared to the assigned position state of the input touch vector.

7. The method of claim 6, further comprising generating, using the processor, haptic feedback upon detecting the change in the assigned position state.

8. A system comprising:
a memory; and
a processor in communication with the memory, the processor configured to perform the operations comprising:
receiving an input touch vector based on one or more signals from a touch sensor having a plurality of touch input channels, the touch sensor arranged between a first end of a curved surface and a second end of the curved surface, wherein each value of the input touch vector corresponds to an index value of a respective touch input channel of the touch sensor;
selecting a largest continuous segment of values in the input touch vector that are indicative of a touch input channel being active, wherein if there is more than one equally largest continuous segment of values, then selecting the equally largest continuous segment of values that corresponds to one or more touch input channels furthest from the second end of the curved surface;
assigning the input touch vector to a position state of a plurality of position states based on the one or more index values corresponding to the selected largest continuous segment of values; and
determining a user input based on the assigned position state.

9. The system of claim 8, wherein each value of the input touch vector is a value indicative of a touch input channel being active or is a value indicative of a touch input channel being inactive.

10. The system of claim 8, wherein the touch sensor is arranged on a curved surface.

11. The system of claim 8, wherein the plurality of position states include a respective position state at each of the plurality of touch input channels of the touch sensor and a respective position state between each of the adjacent touch input channels.

12. The system of claim 8, wherein assigning the input touch vector to a position state comprises determining an average of the one or more index values corresponding to the selected largest continuous segment of values; multiplying the determined average by two to generate an output; and assigning the input touch vector to the position state corresponding to the generated output.

13. The system of claim 8, wherein the operations further comprise:
receiving a second input touch vector; and
detecting a swiping motion of a member along the curved surface by detecting a change in the assigned position state of the second input touch vector compared to the assigned position state of the input touch vector.

14. The system of claim 13, wherein the operations further comprise generating haptic feedback upon detecting the change in the assigned position state.

15. An apparatus comprising:
a button construct including a curved surface having a first side configured to be contacted by a user and a second side, the button construct further including a touch sensor arranged on the second side of the curved surface between a first end of the curved surface and a second end of the curved surface, wherein the touch sensor includes a plurality of touch input channels;
a memory; and
a processor in communication with the memory, the processor configured to perform the operations comprising:
receiving an input touch vector based on one or more signals from the touch sensor, the touch sensor arranged between a first end of a curved surface and a second end of the curved surface, wherein each value of the input touch vector corresponds to an index value of a respective touch input channel of the touch sensor;
selecting a largest continuous segment of values in the input touch vector that are indicative of a touch input channel being active, wherein if there is more than one equally largest continuous segment of values, then selecting the equally largest continuous segment of values that corresponds to one or more touch input channels furthest from the second end of the curved surface;

assigning the input touch vector to a position state of a plurality of position states based on the one or more index values corresponding to the selected largest continuous segment of values; and determining a user input based on the assigned position state.

16. The apparatus of claim 15, wherein each value of the input touch vector is a value indicative of a touch input channel being active or is a value indicative of a touch input channel being inactive.

17. The apparatus of claim 15, wherein the plurality of position states include a respective position state at each of the plurality of touch input channels of the touch sensor and a respective position state between each of the adjacent touch input channels.

18. The apparatus of claim 15, wherein assigning the input touch vector to a position state comprises determining an average of the one or more index values corresponding to the selected largest continuous segment of values; multiplying the determined average by two to generate an output; and assigning the input touch vector to the position state corresponding to the generated output.

19. The apparatus of claim 15, wherein the operations further comprise:

receiving a second input touch vector; and detecting a swiping motion of a member along the curved surface by detecting a change in the assigned position state of the second input touch vector compared to the assigned position state of the input touch vector.

20. The apparatus of claim 19, wherein the button construct further includes a haptic component, and wherein the operations further comprise generating haptic feedback via the haptic component upon detecting the change in the assigned position state.

* * * * *